(12) United States Patent
Clark et al.

(10) Patent No.: US 10,539,084 B2
(45) Date of Patent: *Jan. 21, 2020

(54) VEHICLE ROLLOVER SAFETY DEVICE UTILIZING A CIRCULAR ARC LEVEL

(71) Applicants: Carl M. Clark, Albuquerque, NM (US); Randall S. Lynn, Albuquerque, NM (US)

(72) Inventors: Carl M. Clark, Albuquerque, NM (US); Randall S. Lynn, Albuquerque, NM (US)

(*) Notice: Subject to any disclaimer, the term of this patent is extended or adjusted under 35 U.S.C. 154(b) by 135 days.

This patent is subject to a terminal disclaimer.

(21) Appl. No.: 15/872,829

(22) Filed: Jan. 16, 2018

(65) Prior Publication Data

US 2018/0156145 A1    Jun. 7, 2018

Related U.S. Application Data

(63) Continuation-in-part of application No. 14/944,818, filed on Nov. 18, 2015, now Pat. No. 9,869,286.

(60) Provisional application No. 62/516,351, filed on Jun. 7, 2017, provisional application No. 62/081,127, filed on Nov. 18, 2014.

(51) Int. Cl.
*F02D 17/04*      (2006.01)
*B60R 21/013*     (2006.01)
*F02D 41/04*      (2006.01)
*G01C 9/24*       (2006.01)
*G01C 9/32*       (2006.01)
*G01C 9/26*       (2006.01)
*G01C 9/34*       (2006.01)
*B60R 21/00*      (2006.01)
*F02D 41/12*      (2006.01)

(52) U.S. Cl.
CPC .......... *F02D 41/042* (2013.01); *B60R 21/013* (2013.01); *F02D 17/04* (2013.01); *G01C 9/24* (2013.01); *G01C 9/26* (2013.01); *G01C 9/32* (2013.01); *G01C 9/34* (2013.01); *B60R 2021/0018* (2013.01); *B60R 2021/01306* (2013.01); *F02D 41/123* (2013.01)

(58) Field of Classification Search
CPC ... B60R 2021/0018; B60R 2021/01306; F02D 11/00; F02D 17/04; G01C 9/24; G01C 9/26; G01C 9/32; G01C 9/34
See application file for complete search history.

(56) References Cited

U.S. PATENT DOCUMENTS

| | | | |
|---|---|---|---|
| 3,882,957 A | 5/1975 | Fritz | |
| 4,110,609 A | 8/1978 | Beer | |
| 4,154,000 A * | 5/1979 | Kramer | G01C 9/26 33/366.14 |
| 4,717,904 A | 1/1988 | Murakami | |

(Continued)

OTHER PUBLICATIONS

International Search Report Issued for PCT Application No. PCT/US19/13767 dated Apr. 3, 2019.

*Primary Examiner* — Erick R Solis

(57) ABSTRACT

A vehicle safety rollover device utilizing a circular arc level for detecting vehicle rollover is disclosed. Upon detection, the device automatically shuts-off power to an ignition system and notifies for shut-down of the electrical system of the vehicle. The circular arc level is capable of measuring gravitational norm deviation while remaining impervious to the effects of acceleration, deceleration, impact, and centripetal forces.

16 Claims, 11 Drawing Sheets

(56) References Cited

U.S. PATENT DOCUMENTS

| | | | |
|---|---|---|---|
| 5,029,473 | A | 7/1991 | Jost et al. |
| 5,058,283 | A * | 10/1991 | Wise ................... B60N 2/28 |
| | | | 33/333 |
| 5,204,814 | A | 4/1993 | Noonan et al. |
| 5,572,969 | A | 11/1996 | Coughlin |
| 6,397,133 | B1 | 5/2002 | van der Pol et al. |
| 6,449,858 | B1 * | 9/2002 | Reay ................... G01C 9/06 |
| | | | 33/366.12 |
| 6,728,616 | B1 | 4/2004 | Tabe |
| 8,314,686 | B2 | 11/2012 | Kirtley, Jr. |
| 8,475,275 | B2 | 7/2013 | Weston et al. |
| 8,798,825 | B1 | 8/2014 | Hartman |
| 9,116,784 | B2 * | 8/2015 | Yao ................... B60W 50/14 |
| 2003/0088349 | A1 | 5/2003 | Schubert et al. |
| 2004/0068354 | A1 | 4/2004 | Tabe |
| 2006/0089762 | A1 | 4/2006 | Kurokawa |
| 2008/0208417 | A1 | 8/2008 | Buehlmann et al. |
| 2008/0306653 | A1 | 12/2008 | Hasegawa |
| 2009/0299229 | A1 | 12/2009 | Johnson et al. |
| 2009/0314566 | A1 | 12/2009 | Rust |
| 2010/0052882 | A1 | 3/2010 | Sverrisson et al. |
| 2010/0191408 | A1 | 7/2010 | Boylston et al. |
| 2010/0251956 | A1 | 10/2010 | Hilliard |
| 2010/0320021 | A1 | 12/2010 | Rini et al. |
| 2011/0073065 | A1 | 3/2011 | Jacobson |
| 2011/0253093 | A1 | 10/2011 | Namba |
| 2012/0016544 | A1 | 1/2012 | Pariseau et al. |
| 2012/0185165 | A1 | 7/2012 | Geelen et al. |
| 2012/0245803 | A1 | 9/2012 | Bettany et al. |
| 2013/0110376 | A1 | 5/2013 | Sumilla et al. |
| 2013/0116858 | A1 | 5/2013 | O'Dwyer et al. |
| 2013/0207577 | A1 | 8/2013 | Natsume |
| 2014/0110952 | A1 | 4/2014 | Lange et al. |
| 2015/0283944 | A1 | 10/2015 | Alexander |
| 2016/0040989 | A1 | 2/2016 | Wang et al. |

\* cited by examiner

VEHICLE ROLLOVER SAFETY DEVICE UTILIZING A CIRCULAR ARC LEVEL

CROSS REFERENCE

This application claims priority to U.S. Patent Application No. 62/516,351, filed Jun. 7, 2017 and U.S. Non-provisional application Ser. No. 14/944,818, filed Nov. 18, 2015, which claims priority to U.S. Patent Application No. 62/081,127, filed Nov. 18, 2014, the specification(s) of which is/are incorporated herein in their entirety by reference.

FIELD OF THE INVENTION

The present invention relates to automobile safety, namely, a rollover safety device employing a circular arc level for detecting when a vehicle rolls or flips over.

BACKGROUND OF THE INVENTION

Rollover crashes are one of the most significant safety problem for all classes of light vehicles especially light trucks (pickups, sport utility vehicles, and vans—LTVs). For 1992 through 1996, there was an average of approximately 227,000 rollover crashes per year. (Rollover crashes are ones in which rollover is the first harmful event.) These rollovers resulted in an average of 9,063 fatalities per year (29 percent of all light vehicle fatalities) and over 200,000 non-fatal injuries per year. In terms of fatalities per registered vehicle, rollovers are second only to frontal crashes in their level of severity. The rollover problem is more serious for light trucks, especially sport utility vehicles. State crash data indicates that, for all types of collisions, LTV's are in 68 percent as many crashes per registered vehicle as are passenger cars.

A major problem in rollover accidents is the release of fuel, which can trigger a fire and greatly increase the injury and fatality rate in rollover accidents. Thus, a goal of vehicle safety is to disable the fuel pump and engine when a rollover occurs as well as electrical sources of ignition such as the starter and electrical system. Disabling the starter and electrical system reduces the chances of igniting a fire if fuel escapes.

In the US alone and at the start of 2014, there exist approximately 241 million registered passenger vehicles without rollover safety. In 2014, it is expected that an additional 16 to 17 million more will be added to the tally. The present invention describes a rollover detection device effective for providing rollover safety to all vehicles having an electric fuel pump.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The invention comprises a rollover safety device that automatically shuts off both the engine and electric fuel pump the instant a vehicle rolls or flips over a critical angle in any direction. The angles used to determine excessive tilt, or inclination, tend to vary by vehicle application. For instance, box shaped vehicles typically tip on their sides but rarely continue to roll over. The safety device can be configured to trigger at a desired angle of inclination depending on the vehicle type. The safety device is designed to be resectable with manufacturer support after such an accident. Once set due to a rollover, the safety device remains set, independent of power, until reset by a trained technician.

By shutting off power to the fuel pump and starter, and shutting off the engine, the invention can reduce fires and explosions resulting from severe rollover accidents. In addition to saving lives, by reducing the hazards of rollover accidents, liability claims from rollover accidents can be reduced. The invention is relatively simple and cost-effective to construct, and is advantageous by not requiring power to keep the engine and fuel pump inoperative.

According to one embodiment, the subject disclosure features a vehicle safety rollover device that, upon detection of a vehicle rollover, automatically shuts-off power to an ignition system of said vehicle and shuts down the electrical system and fuel pump of the vehicle. In some embodiments, the safety device comprises a power input, a ground input, a first latching relay switch, and a second latching relay switch. The ground input may be operatively connected to a vehicle common ground.

In other embodiments, the first and second latching relay switches each comprise: an input, a first output position, a second output position, a set pin, and a reset pin, which is also connected to the ground input. The first output position is the initial position of each latching relay switch. When power is supplied to the set pin, the respective latching relay switch switches to the second output position.

In further embodiments, the safety device additionally comprises an ignition start input, an ignition start output, and an electrical shut-off signal. The ignition start input may be operatively connected to the input of the first latching relay switch, while the ignition start output may be operatively connected to the first output position of the first latching relay switch. Further, the electrical shut-off signal may be operatively connected to the second output position of the second latching relay switch, where the input of the second latching relay switch may be operatively connected to the power input.

In additional embodiments, the safety device employs a circular arc level, herein referred to as a CAL sensor, to detect an inclination of the vehicle. In some embodiments, the CAL sensor comprises an arcuate tube partially filled with a liquid. An air bubble is disposed in the arcuate tube such that the liquid and the air bubble fill the arcuate tube. In an embodiment, the air bubble rests at an apex of the arcuate tube when an inclination of the CAL sensor is zero. In other embodiments, the CAL sensor also comprises a first and second light emitting element each disposed on the exterior of the arcuate tube.

In other embodiments, the first light emitting element is disposed at a first location about 75°-90° from the apex of the arcuate tube and emits a first optical signal. The second light emitting element is disposed at a second location about 270°-285° from the apex of the arcuate tube and emits a second optical signal. In supplementary embodiments, the CAL sensor may further comprise a first and second photodetector each disposed on the exterior of the arcuate tube. The first photodetector is disposed at a third location about 75°-90° from the apex of the arcuate tube, where the third location is opposite the first location such that the arcuate tube is disposed between the first light emitting element and the first photodetector. The first photodetector is positioned to detect the first optical signal when the air bubble is positioned between them. Additionally, the second photodetector is disposed at a fourth location about 270°-285° from the apex of the arcuate tube, where the fourth location is opposite the second location such that the arcuate tube is disposed between the second light emitting element and the second photodetector. The second photodetector is positioned to detect the second optical signal when the air bubble is positioned between them. Non-limiting examples of light emitting elements are light emitting diodes (LEDS).

The liquid disposed in the arcuate tube is selected to prohibit detection of the first and second optical signals by the first and second photodetectors, respectively. For example, the liquid may be black to absorb all visible light signals emitted by the light emitting elements. As another example, the liquid may be green or yellow to block a red light signal. As can be understood by one of ordinary skill in the art, many such combinations exist.

In supplementary embodiments, a conductive pin, a transistor, and a normally open switch additionally comprise the safety device. The conductive pin may be operatively connected to the battery power. The transistor may comprise a base pin, a collector pin, and an emitter pin. In an embodiment, the collector pin is connected to the alternator power while the emitter pin is connected to the first and second latching relay switches. In another embodiment, the base pin is connected to the conductive pin via the switch. The switch is operatively coupled to the first and second photodetector such that a first signal sent from the first photodetector (209) or a second signal sent from the second photodetector activates the switch to close.

Consistent with previous embodiments, the CAL sensor is fixed to the body of the vehicle. When the CAL sensor is in an upright position relative to gravity, the air bubble rests at an initial position at the apex of the arcuate tube and the liquid is blocking detection of the first optical signal and the second optical signal. At an inclination of the CAL sensor within a first threshold window, centered at about 75°-90° from the apex of the arcuate tube, the air bubble travels from the initial position to rest between the first photodetector and the first light emitting element, thus activating the CAL sensor by permitting detection of the first optical signal. Upon detection of the first optical signal, the first photodetector transmits a first signal that activates the switch to close. In this way, a circuit is formed to allow current to flow through the conductive pin to the base pin, opens an electrical path from the battery power to each set pin.

Additionally, at an inclination of the CAL sensor within a second threshold window, centered at about 270°-285° from the apex of the arcuate tube, the air bubble travels from the initial position to rest between the second photodetector and second light emitting element, thus activating the CAL sensor by permitting detection of the second optical signal. Upon detection of the second optical signal, the second photodetector transmits a second signal that activates the switch to close. In this way, a closed circuit is formed to allow current to flow through the conductive pin to the base pin, which opens an electrical path from the battery power to each set pin.

At an application of the battery power to each set pin, the first and second latching relay switches switch from the first output position to the second output position, thus disconnecting power to the ignition starter. Moreover, power then flows to the electrical shutoff signal, via the second latching relay switch, thereby causing the electrical system of the vehicle to shut down.

One of the unique and inventive technical features of the present invention is the implementation of a circular arc level sensor to detect vehicle rollover. Without wishing to limit the invention to any theory or mechanism, it is believed that the CAL sensor advantageously provides for an improved detection as a result of its lack of mass affected by centripetal or impact forces.

Moreover, the CAL sensor employed in the present invention yields the most cost effective solution for sensing rollover. Since a single air bubble works in both directions simultaneously, only one CAL sensor is required for roll, and one for flip, if flip is necessary. The CAL sensor minimizes the potential of false triggering, provided that adequate debounce delay is created. Furthermore, the CAL sensor is self-resetting.

DESCRIPTION OF PREFERRED EMBODIMENTS

Figure 1:
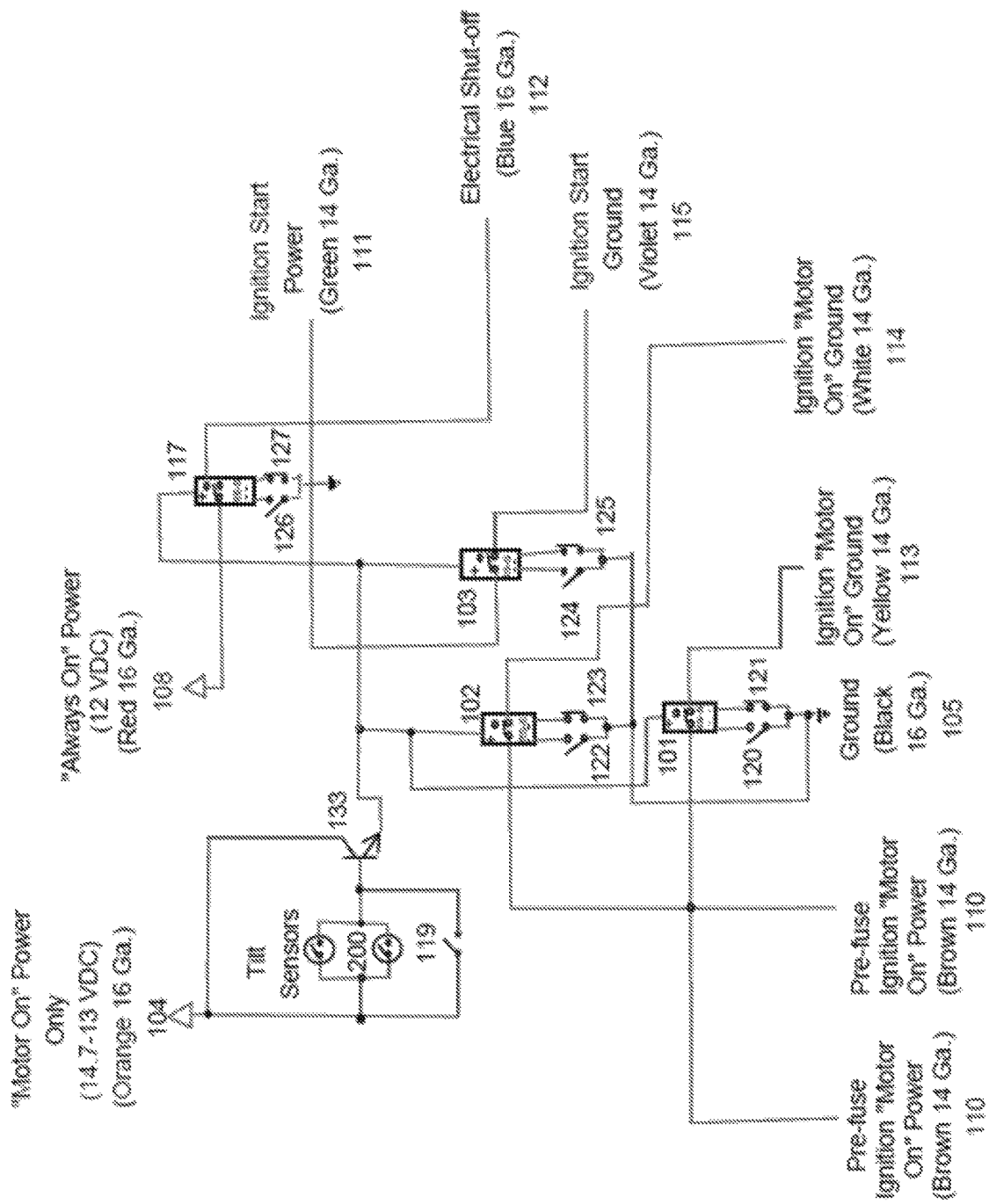
FIG. 1 shows a relay control schematic of an embodiment of the present invention comprising four relay switches.
Figure 2:
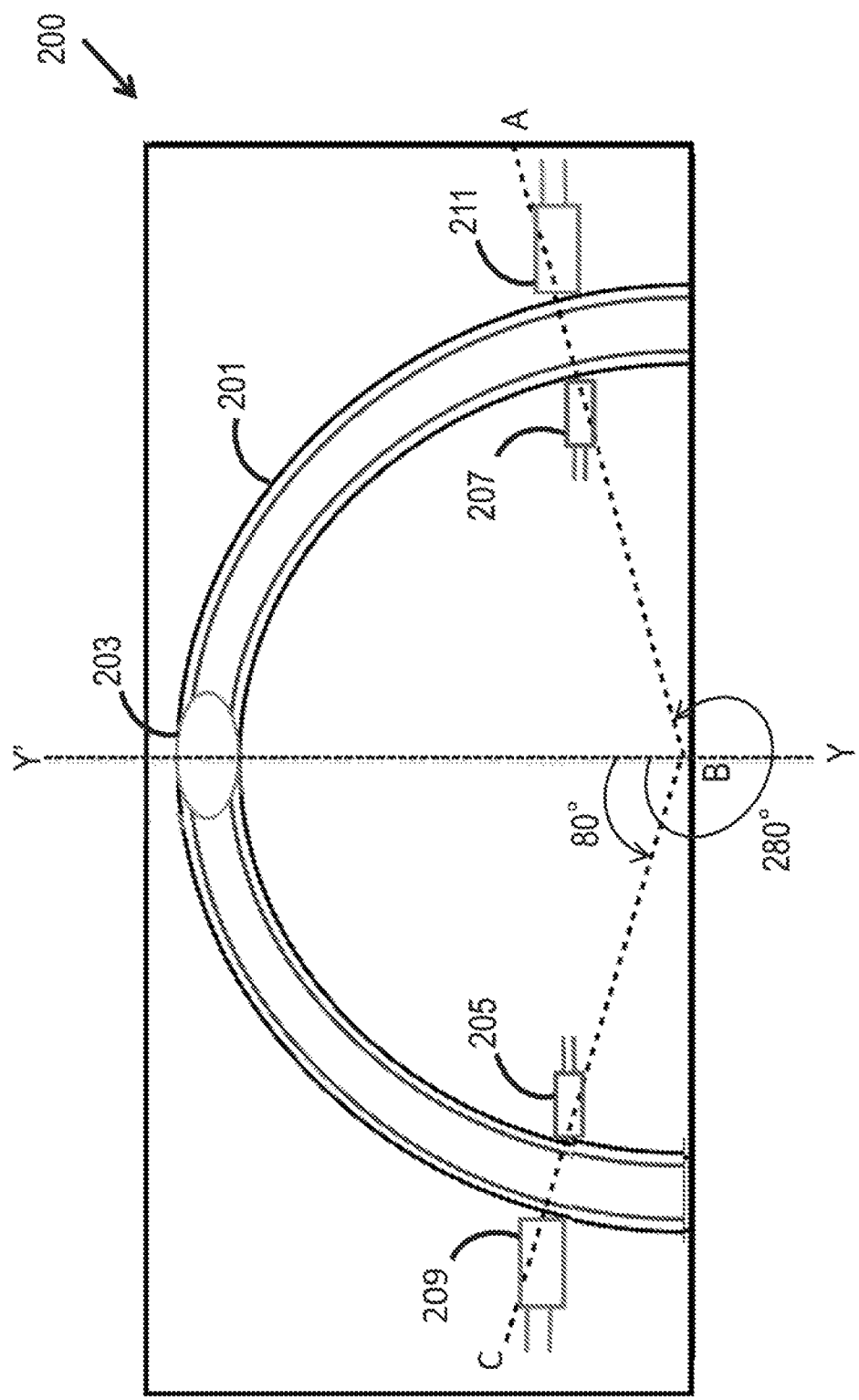
FIG. 2 shows a diagrammatic representation of a circular arc level (CAL) used as a sensor in the present invention.

Following is a list of elements corresponding to a particular element referred to herein:
  101 third latching relay switch
  102 fourth latching relay switch
  103 first latching relay switch
  104 alternator power
  105 ground input
  108 battery power
  110 first and second ignition switch motor-on inputs
  111 ignition start input
  112 electrical shut-off signal
  113 first ignition switch motor-on output
  114 second ignition switch motor-on output
  115 ignition start output
  117 second latching relay switch
  119-127 DIP switch positions
  133 transistor
  200 circular arc level sensor
  201 arcuate tube
  203 air bubble
  205 first light emitting element
  207 second light emitting element
  209 first photodetector
  211 second photodetector
  502 screws
  504 flange lid
  506 photodetectors 508 light emitting elements
510 CAL sensor
512 photo optic circuit board
514 relay control board, circuit board
516 fuel pump control relay
517 Ignition control relays
518 wires
520 insulator
522 housing
602 first light emitting element
604 first photo detector
606 second light emitting element
608 second photo detector
610 leads
902 arc level tube
904 clear material
906 CAL end points
1006 dual comparator
1007 single comparator
1008 Logical OR Gate Referring to FIGS. 1-10, the present invention is a vehicle rollover safety device comprising a custom sensor and circuit to detect vehicle rollover where, upon detection, the safety device shuts off power to the fuel pump, starter, and engine. In some embodiments, the safety device comprises a power input, a ground input (105), a first latching relay switch (103), and a second latching relay switch. The ground input (105) is operatively connected to a vehicle common ground.

In other embodiments, the first (103) and second (117) latching relay switches each comprise: an input, a first output position, a second output position, a set pin, and a reset pin, which is also connected to the ground input (105). The first output position is the initial position of each latching relay switch. When power is supplied to the set pin, the respective latching relay switch switches to the second output position.

In further embodiments, the safety device additionally comprises an ignition start input (111), an ignition start output (115), and an electrical shut-off signal (112). The ignition start input (111) may be operatively connected to the input of the first latching relay switch (103), while the ignition start output (115) may be operatively connected to the first output position of the first latching relay switch (103). Further, the electrical shut-off signal (112) may be operatively connected to the second output position of the second latching relay switch (117), where the input of the second latching relay switch (117) may be operatively connected to the power input.

Figure 9:
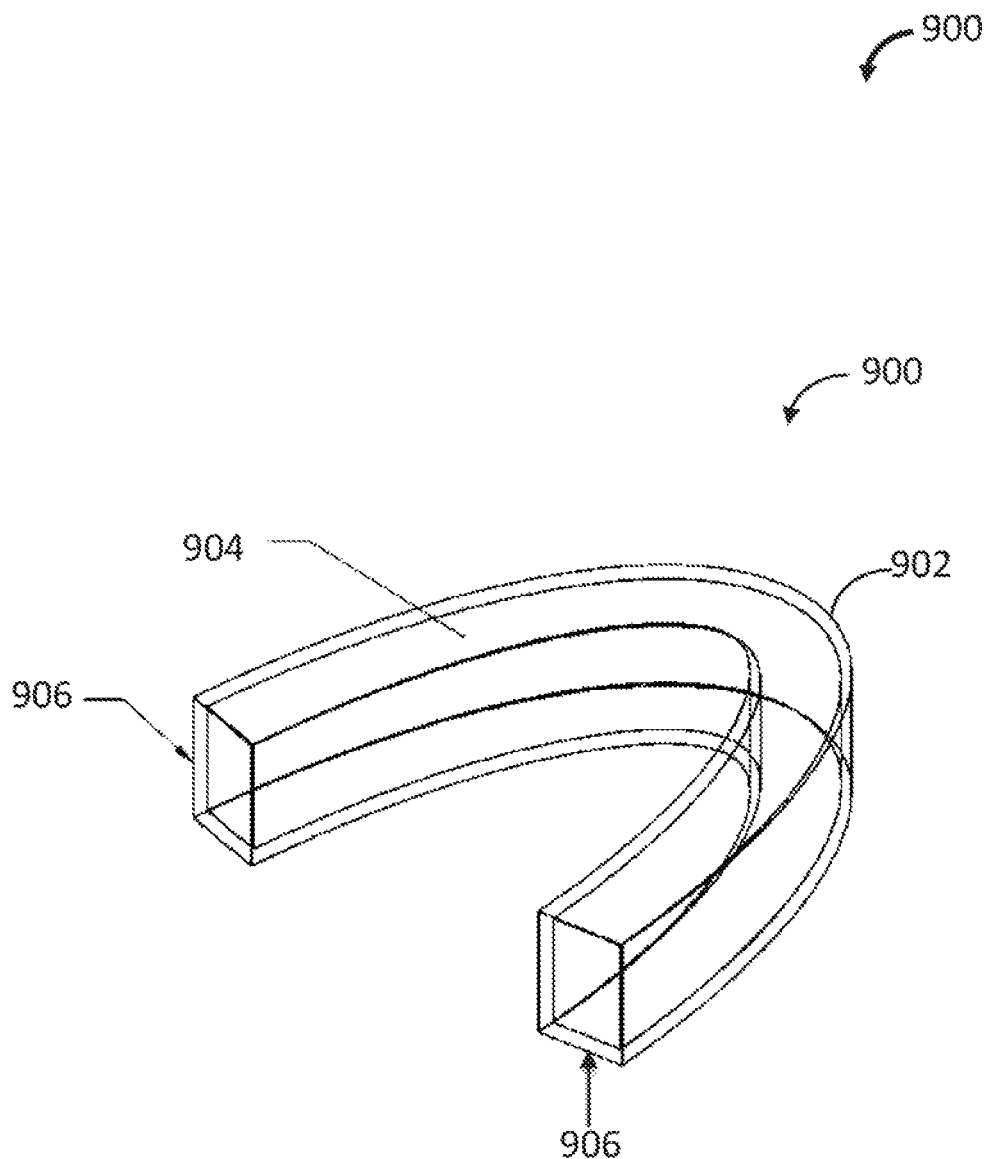
FIG. 9 shows an example embodiment of an elliptical sensor.

In additional embodiments, the safety device employs a circular arc level (200), herein referred to as a CAL sensor, to detect an inclination of the vehicle. In other embodiments, the CAL sensor comprises an arcuate tube (201) partially filled with a liquid. An air bubble (203) is disposed in the arcuate tube (201) such that the liquid and the air bubble (203) fill the arcuate tube (201). In an embodiment, the air bubble (203) rests at an apex of the arcuate tube (201) when an inclination of the CAL sensor (200) is zero. In alternate embodiments, the safety device employs an elliptical arc sensor, an embodiment of which is illustrated in FIG. 9. Turning now to FIG. 9, the elliptical arc sensor (900) having an elliptical tube (902) is shown. In one non-limiting example, the tube (902) may include ends (906) that have a rectangular shape. The inside of the elliptical tube (902) is partially filled with a liquid/material (904).

Returning to FIG. 2, in some embodiments, the CAL sensor (200) also comprises a first (205) and second (207) light emitting element each disposed on the exterior of the arcuate tube (201). In other embodiments, the first light emitting element (205) is disposed at a first location about 75°-90° from the apex of the arcuate tube (201) and emits a first optical signal. The second light emitting element (207) is disposed at a second location about 270°-285° from the apex of the arcuate tube (201) and emits a second optical signal. In supplementary embodiments, the CAL sensor (200) may further comprise a first (209) and second (211) photodetector each disposed on the exterior of the arcuate tube (201). The first photodetector (209) is disposed at a third location about 75°-90° from the apex of the arcuate tube (201), where the third location is opposite the first location such that the arcuate tube (201) is disposed between the first light emitting element (205) and the first photodetector (209). The first photodetector (209) is positioned to detect the first optical signal when the air bubble (203) disposed in the arcuate tube (201) is positioned between them, as the arcuate tube (201) is transparent (or substantially transparent) at least between the first photodetector (209) and the first light emitting element (205). Additionally, the second photodetector (211) is disposed at a fourth location about 270°-285° from the apex of the arcuate tube (201), where the fourth location is opposite the second location such that the arcuate tube (201) is disposed between the second light emitting element (207) and the second photodetector (211). In preferred embodiments, the second photodetector (211) is positioned to detect the second optical signal when the air bubble (203) disposed within the arcuate tube (201) is positioned between them, as the arcuate tube (201) is transparent (or substantially transparent) at least between the second photodetector (211) and the second light emitting element (207).

In one non-limiting example embodiment, the first light emitting element (205) is disposed at the first location about 80° from the apex of the arcuate tube (201) and the first photodetector (209) is positioned opposite the first emitting element (205), at 80° from the apex of the arcuate tube (201). In such an example, the second light emitting element (207) is disposed at the second location 280° from the apex of the arcuate tube (201) and the second photodetector (211) is positioned opposite the second light emitting element (207), at 280° from the apex of the arcuate tube (201). As such, the positions of the first light emitting element and the first photodetector may be interchanged without deviating from the scope of the invention. Likewise, the positions of the second light emitting element and the second photodetector may be interchanged without deviating from the scope of the invention. Non-limiting examples of light emitting elements are light emitting diodes ("LEDs").

The liquid disposed in the arcuate tube (201) is selected to prohibit detection of the first and second optical signals by the first (209) and second (211) photodetectors, respectively. For example, the liquid may be black to absorb all visible light signals emitted by the light emitting elements. As another example, the liquid may be green or yellow to block a red light signal. As can be understood by one of ordinary skill in the art, many such combinations exist.

In supplementary embodiments, a conductive pin, a transistor (133), and a normally open switch additionally comprise the safety device. The conductive pin may be operatively connected to the battery power. The transistor (133) may comprise a base pin, a collector pin, and an emitter pin. In an embodiment, the collector pin is connected to the alternator power (104) while the emitter pin is connected to all four latching relay switches (103), (117), (102), and (101). In another embodiment, the base pin is connected to the conductive pin via the switch. The switch is operatively coupled to the first and second photodetector (211) such that a first signal sent from the first photodetector (209) or a second signal sent from the second photodetector (211) activates the switch to close.

Consistent with previous embodiments, the CAL sensor (200) is fixed to the body of the vehicle. When the CAL sensor (200) is in an upright position relative to gravity, the air bubble (203) rests at an initial position at the apex of the arcuate tube (201) and the liquid is blocking detection of the first optical signal and the second optical signal. In one example embodiment, at an inclination of the CAL sensor (200) within a first threshold window, centered at about 75°-90° from the apex of the arcuate tube (201), the air bubble (203) travels from the initial position to rest between the first photodetector (209) and the first light emitting element (205) thus activating the CAL sensor by permitting detection of the first optical signal. Upon detection of the first optical signal, the first photodetector (209) transmits a first signal that activates the switch to close. In this way, a closed circuit is formed to allow current to flow through the conductive pin to the base pin, which opens an electrical path from the battery power to each set pin.

Additionally, at an inclination of the CAL sensor (200) within a second threshold window, centered at about 270°-285° from the apex of the arcuate tube (201), for example, the air bubble (203) travels from the initial position to rest between the second photodetector (211) and second light emitting element (207) thus activating the CAL sensor by permitting detection of the second optical signal. Upon detection of the second optical signal, the second photodetector (211) transmits a second signal that activates the switch to close. In this way, a closed circuit is formed to allow current to flow through the conductive pin to the base pin, which opens an electrical path from the battery power to each set pin.

At an application of power (e.g. battery power) to each set pin, the first (103) and second (117) latching relay switches switch from the first output position to the second output position, thus disconnecting power to the ignition starter. Moreover, power then flows to the electrical shutoff signal (112), via the second latching relay switch (117), notifying need for the electrical system of the vehicle to shut down.

In an alternate embodiment, the safety device further comprises a third latching switch (101) and a fourth latching relay switch (102) each comprising: an input, a first output position, a second output position, a set pin, and a reset pin, which is also connected to the ground input (105). The first output position is the initial position of each latching relay switch. When power is supplied to the set pin, the respective latching relay switch switches to the second output position. In some embodiments, a first ignition switch motor-on input (110) is operatively connected to the input of the third latching relay switch (101), and a second ignition switch motor-on input (110) is operatively connected to the input of the fourth latching relay switch (102). Further, a first ignition switch motor-on output (113) may be operatively connected to the first output of the third latching relay switch (101), and a second ignition switch motor-on output (114) may be operatively connected to the first output of the fourth latching relay switch (102).

Initially, the alternator power (104) flows through the third (101) and fourth (102) latching relay switch to the first (110) and the second (110) ignition switch motor-on input. When the CAL sensor (200) is activated, power flows from the power input to the set pins of the first (103), the second (117), the third (101), and the fourth (102) latching relay switches, causing each relay switch to switch from the first output position to the second output position. In this way, power to the first ignition switch motor-on input (110), the second ignition switch motor-on input (110), and the ignition starter is disconnected. Moreover, power flows to the electrical shutoff signal (112), thereby causing: notification for the electrical system of the vehicle to shut down, a notifying of an overseeing computer, and/or summoning of an emergency response. In an alternative embodiment, ignition start leads are connected to fuel pump power such that the fuel pump is shut off when the safety device is triggered.

In some embodiments, the safety device may be mounted on a plane parallel to the vehicle firewall in order to monitor vehicle roll and/or on a plane perpendicular to the firewall to monitor vehicle flip. In other embodiments, the safety device may be placed within the steering column, behind the break pedal or clutch on the inside of the engine firewall. The CAL sensor may include a plurality of LEDs and photodetectors to detect vehicle rollover based on the change in bank angle with respect to time. By computing the time taken for three consecutively increasing angle photodetections, a roll acceleration can be calculated. If the predicted roll acceleration exceeds the effects of gravity to prevent the roll, the vehicle will rollover.

In further embodiments, the safety device may comprise a dual in-line package (DIP) switch having a plurality of DIP switch positions (119-127). Each latching relay switch has two reset pins. In one aspect, connecting the first reset pin to the ground input causes the latching relay switch to switch to the second output position when power is applied to the set pin. In another aspect, connecting the second reset pin causes the relay switch to switch to the first output position when power is applied to the set pin. The DIP switch positions are connected to the two reset pins of the latching relay switches, and the final position of the DIP switch (119) bypasses the sensor, permitting a sensor trigger to be simulated during pre-installation testing. The DIP switches are nominally set such that the ground input is connected to the first reset pin and disconnected from the second reset pin. To reset the safety device, the DIP switch positions are reset so that the ground input is connected to the second reset pin of each relay switch. When the final DIP switch position is flipped, power is supplied to the latching relay switches, which causes them to switch to the original first output position. This causes the safety device to reset and the DIP switch positions to be reset to their original positions. As a result, the DIP switch permits all logic in the safety device to be tested.

Three Relay Embodiment

Figure 3:
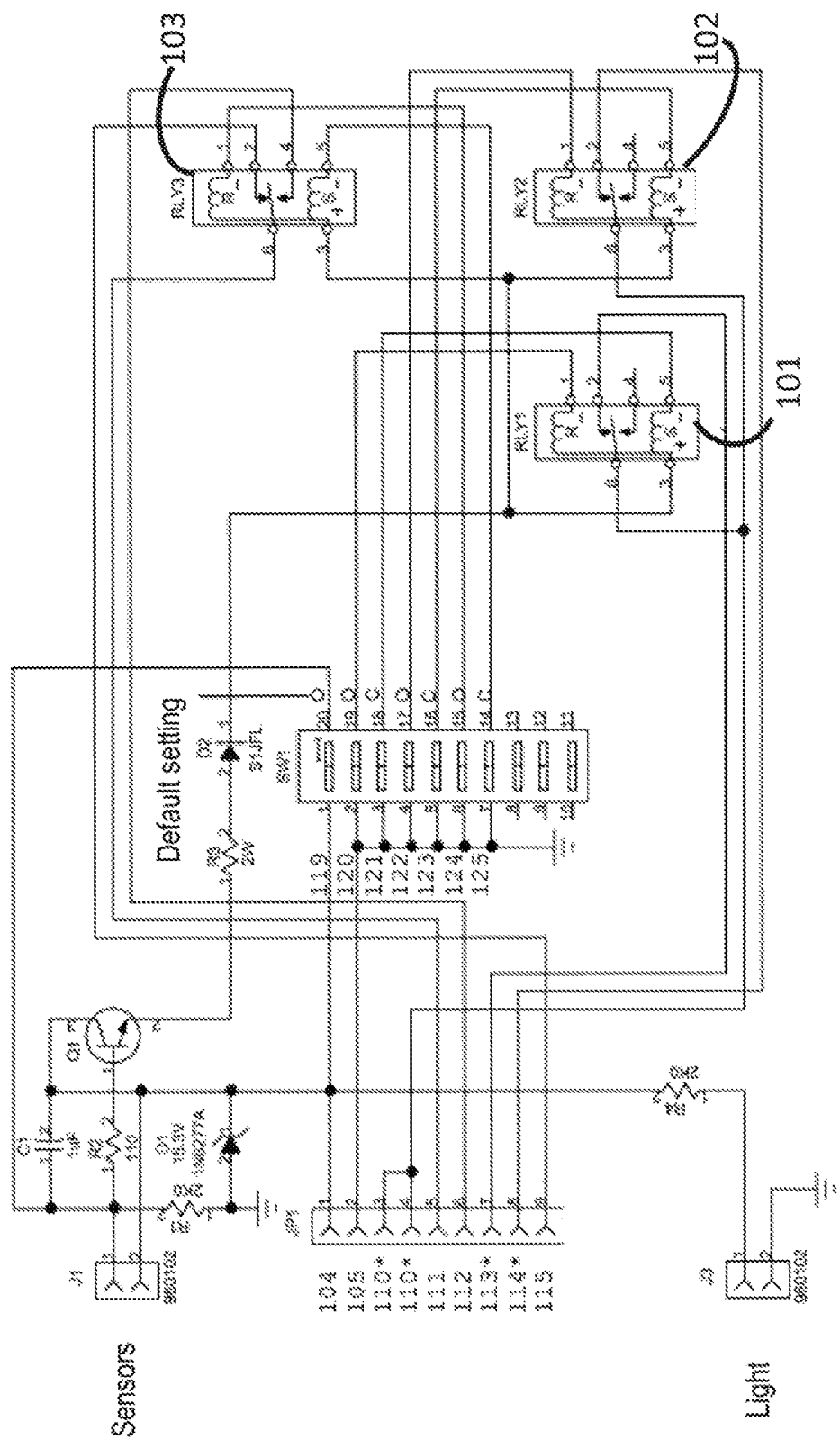
FIG. 3 shows a simplified relay control schematic an embodiment of the present invention comprising three relay switches.
Figure 4:
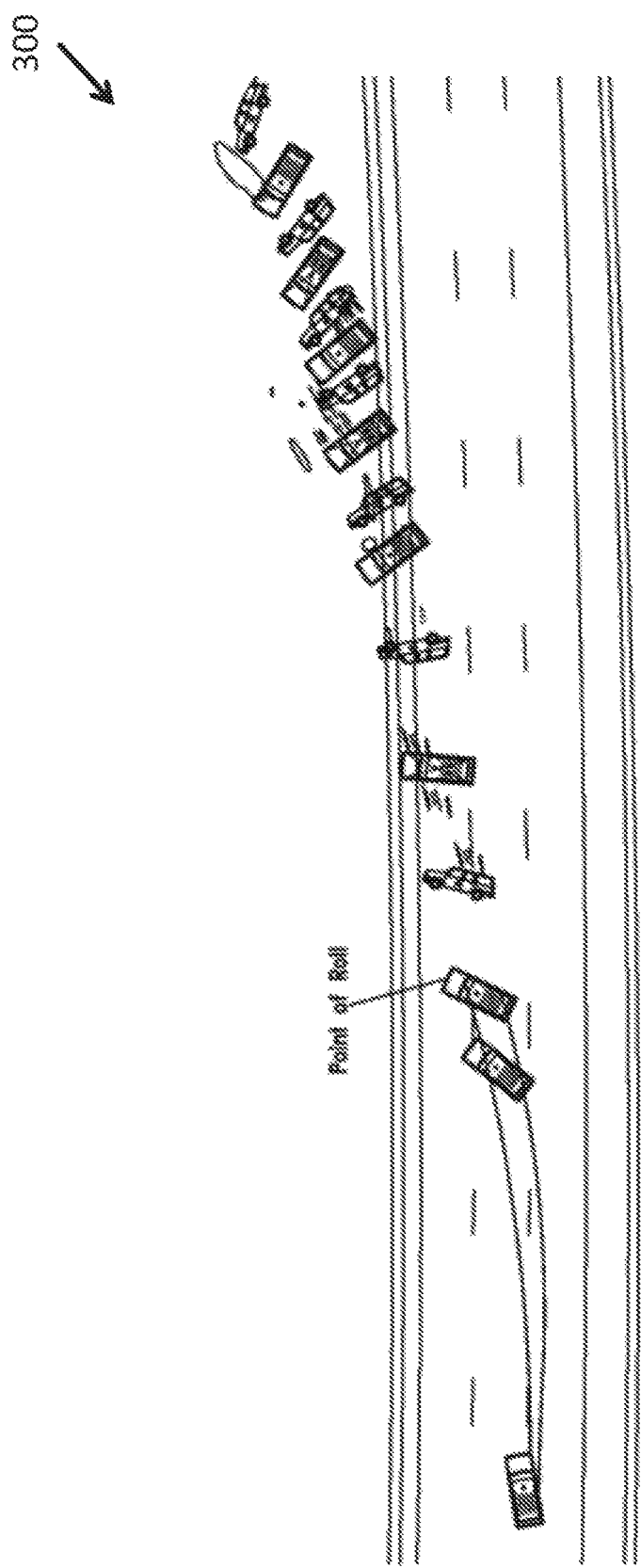
FIG. 4 shows a bird's eye view of a vehicle roll-over.
Figure 5:
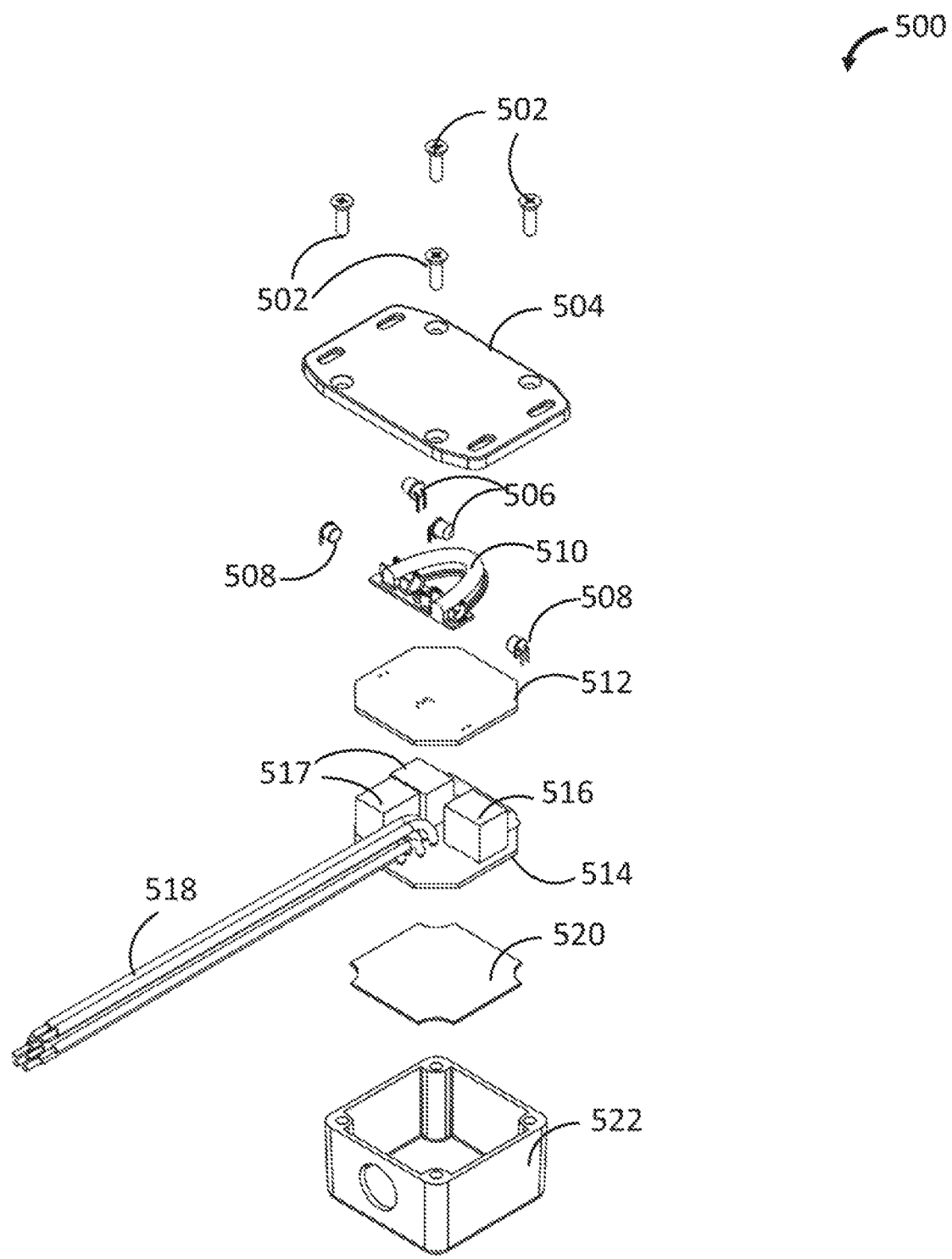
FIG. 5 shows an exploded view of the mechanical implementation of an embodiment of the present invention.

Referring now to FIG. 3, an alternate configuration of the vehicle rollover safety device disclosed herein. Said configuration is one embodiment for shutting off the ignition start and fuel pump using the CAL. Further, the alternate configuration eliminates the need for the relay connecting/disconnecting the electrical line to the starter of the vehicle. In FIG. 3, the alternate configuration of the vehicle safety device includes three relay latching switches (101), (102), and (103) of FIG. 1, and does not include the second relay latching switch (117) of FIG. 4.

Figure 10A:
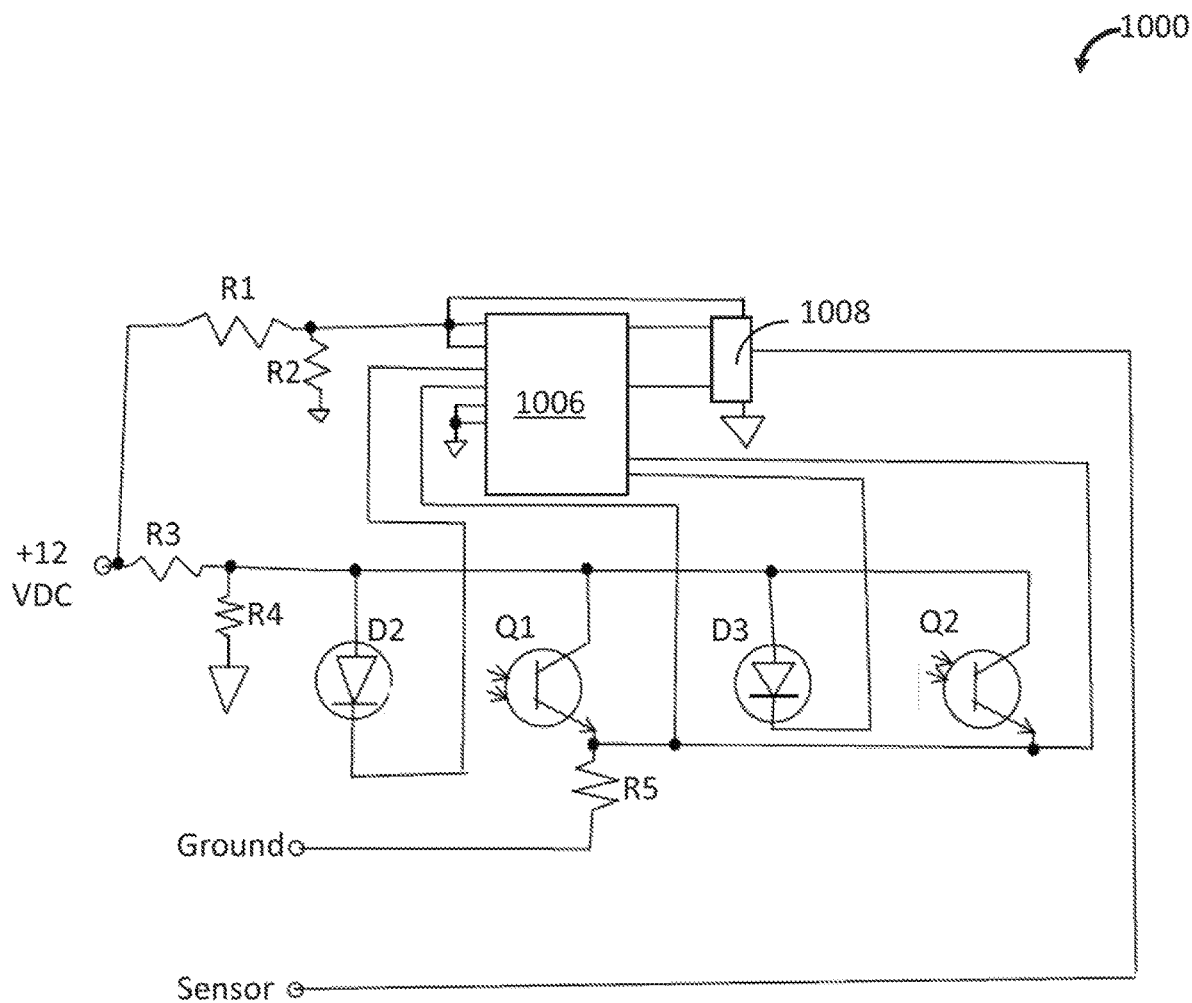
FIG. 10A-10B shows example embodiments of photo optic schematics that drive the photo optic components of the present invention.

FIGS. 5-8 illustrate a mechanical implementation of an embodiment of the present invention and FIGS. 10A and 108 illustrate example additional circuitries of the present invention. A sensor (510), such as the CAL sensor 200 of FIG. 2 and/or the elliptical arc sensor (900) of FIG. 9, is mounted on a printed circuit board (PCB) (512). The PCB (512) sits atop circuit board (514) which includes a relay circuitry or ignition control relays (517) and a photo optic circuitry (516). The photo optic circuitry of FIG. 10A or FIG. 10B may be one non-limiting example of the relay circuitry described with reference to FIGS. 1 and 3. More specifically, the Ignition control relays (617) detects vehicle rollover where, upon detection, the relay circuitry within the safety device shuts off power to the fuel pump, starter, and engine. The photo optic printed circuit board (PCB) that drives the photo optic components of the sensor (510) is described further below with reference to FIGS. 10A-B.

Wires (518) couple the components of the photo optic parts to the PCB 512 to external components. As described previously with reference to FIG. 5, light emitting elements (508) and photodetectors (506) interface through an exterior of the arcuate tube sensor.

Figure 6:
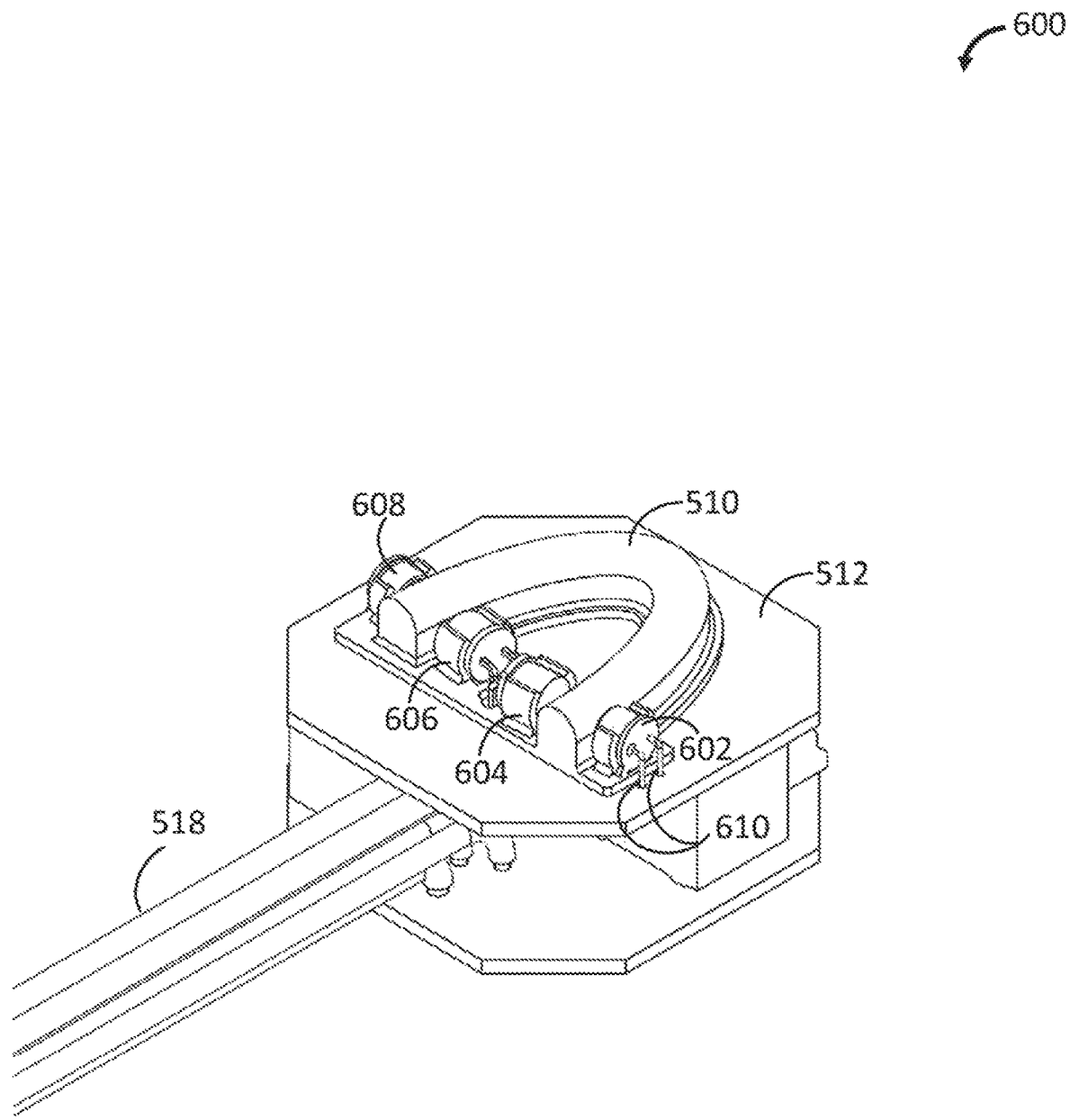
FIG. 6 shows a magnified view of the CAL sensor having light emitters and light detectors mounted to an exterior of the CAL sensor.

A magnified view (600) of FIG. 6 shows a first light emitting element (602) shining through an end point (or a first end) of the sensor (510). A first photodetector (604) is mounted diametrically opposite to the first light emitting element (602) Likewise, a second light emitting element (606) shines through the other end point (or a second end) of the sensor (510), and a second photodetector (608) is mounted diametrically opposite to the second light emitting element (606), on the other end point of the sensor (510). Leads (610) of each of the first light emitting element, second light emitting element, first photodetector, and the second photodetector solder into underlying PCB (512) and electrically couple the light emitting elements and the detectors to the underlying photo optic circuitry (516).

Figure 10B:
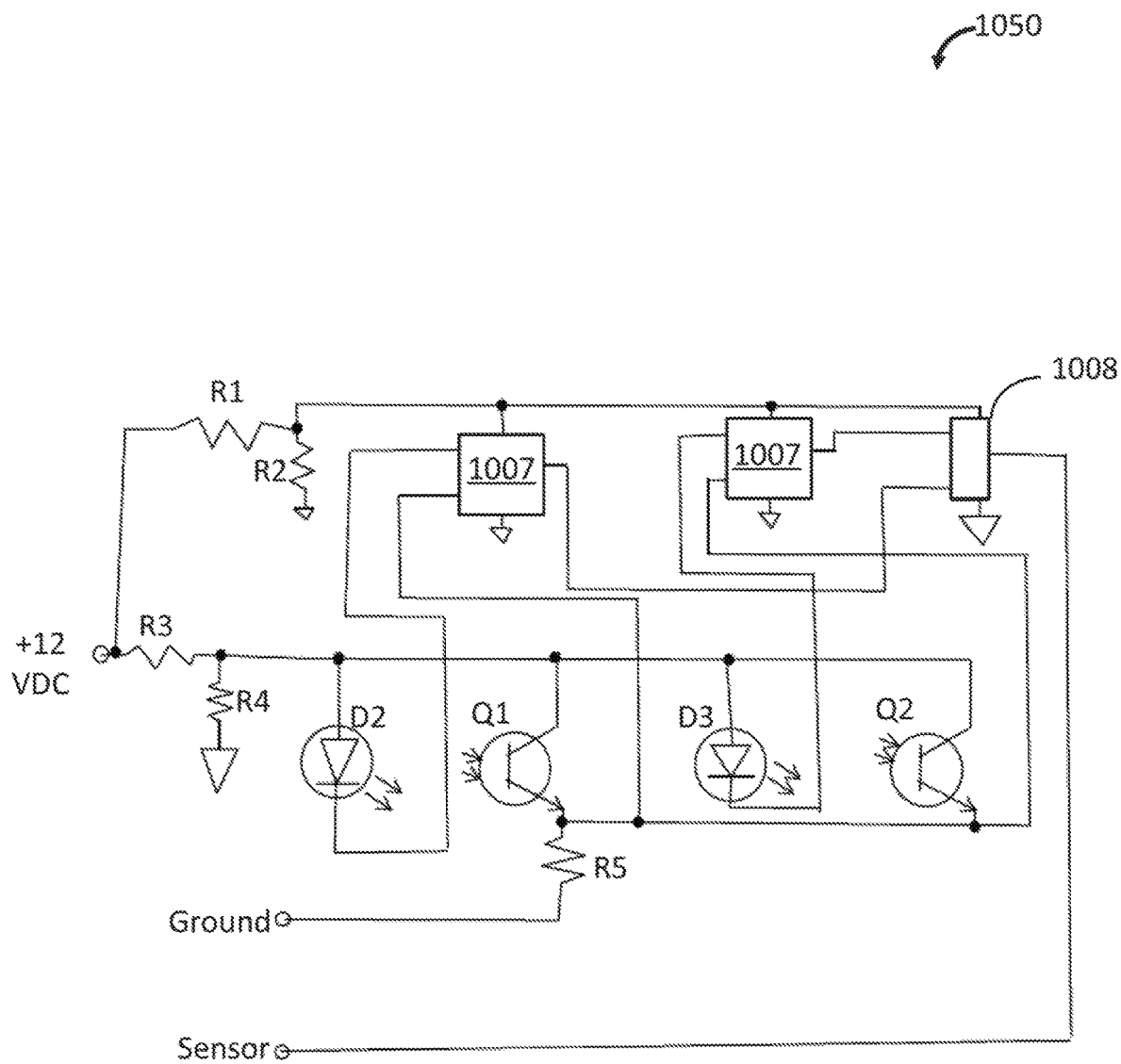

Turning now to FIGS. 10A and 10B, schematic diagrams of example photo optic circuitries (1000) and (1050) that drive the photo optic components of the sensor (510) are shown. Specifically, the photo optic circuitries drive the light emitting elements and the photo detectors coupled to the sensor (510). Photo optic circuit (1000) includes a single dual-comparator 1006, resistors R1-R5, transistors Q1-Q2, photo diodes Q2-Q3. In another example embodiment, photo optic circuit 1050 includes two single comparators (1007), instead of a single dual-comparator (1006). As an example, the photo optic circuits (1000) and (1050) read the presence of antifreeze based on the voltage applied to the IR emitter. The voltage output of the photo transistor varies in an inverse square relationship to the IR emitter's input voltage.

Figure 7:
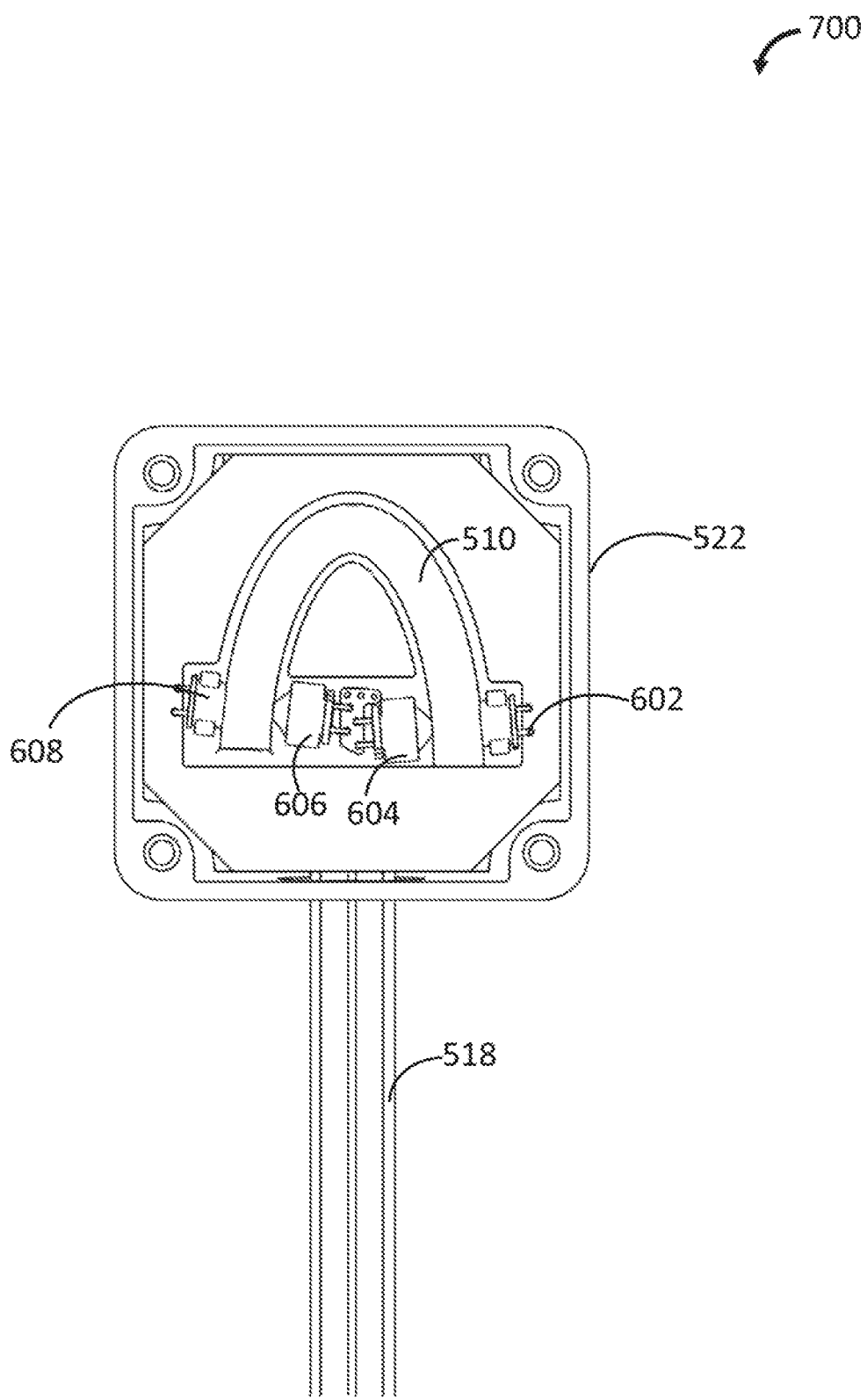
FIG. 7 shows a top view of the CAL sensor.
Figure 8:
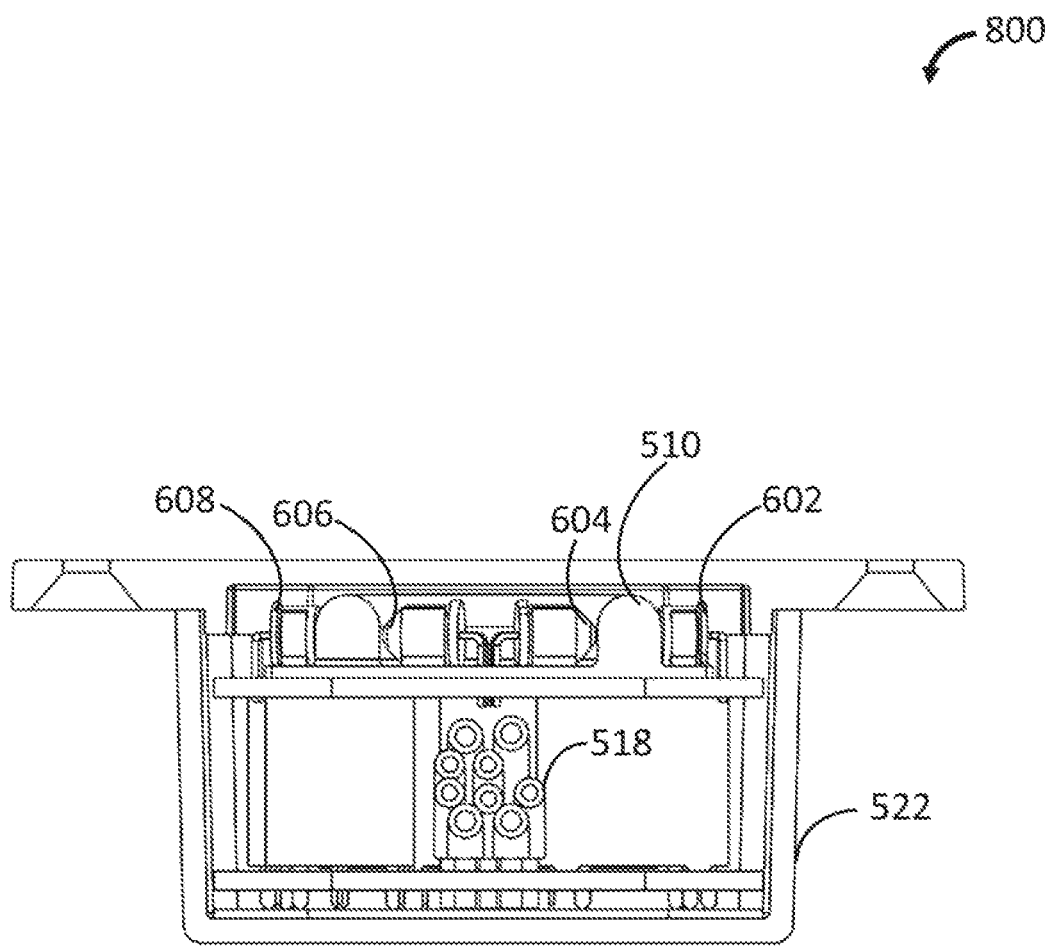
FIG. 8 shows a cross-sectional view of the CAL sensor.

Surround clamps may be used to accurately position flanged cylindrical electronic parts, such as, but not limited to: LEDs, IR emitters, Photo diodes and Photo transistors. When designing surround clamps with materials that flex, but return to their original shape when unused, it is best to size the clamp's inner diameter and top opening one measurable unit smaller than the minimum tolerance range of part's outer diameter. As 3D printer technology futures, it is more economical to manufacture and test these clamps for wall thickness acceptability than running through extensive material stress analysis calculations, In general, the thicker the clamp wall, the more force is required to insert and remove the part from the clamp. These clamps may include a flange slot or ring to insure the part remains positioned precisely within the clamp. The sensor (510) along with the relay circuitry (516) and the photo optic circuitry (516) are mounted inside a box (522) and sealed using flange lid (504) and insulator (520). The flange lid (504) is mounted to the box (522) with the aid of screws (502). The entire assembly with the sensor, light-emitting elements, photo detectors and the circuitries mounted inside the box may be referred to as a vehicle roll-over detection unit. A top view of the unit is shown in FIG. 7, and a cross-sectional view of the unit is shown in FIG. 8.

Additional Features of the Present Device

In some example embodiments, the unit may automatically reset following roll over upon receiving appropriate protocol from a hardwired cell phone interface. Additionally, or alternatively, the unit may include redundant sensors detecting the roll over condition, the CAL and an accelerometer. These sensors may be ANDED together for rollover realization. Additionally, or alternatively, the unit may deter auto theft by detecting a manual jump start attempt and report the attempt to both driver/police. Herein, two cell phones may be used, one permanently associated with the car, and another maintained by the driver. Additionally, or alternatively, the unit may be operated in a security mode wherein the unit may require the thief to hard wire repair the cut in the fuel pump line and jump start by passing the ignition system, all while the microprocessor (uP) may be detecting the theft attempt and reporting its progress to the driver/police. Additionally, or alternatively, the unit may stop an engine from being started if the temperature is below manufacturer's (or driver's) specified tolerance. Additionally, or alternatively, the unit may cause an "out of gas condition" if the engine temperature exceeds a learned maximum, thus reducing, engine damage upon overheating. Additionally, or alternatively, each unit may maintain its own historical log which may be examined and used to further optimize the unit's future operation. Additionally, or alternatively, the unit may have a direct USB cell phone interface that may reduce the possibility of RF emission that could be captured and replayed for illegal car starting. All communication across this interface may be time/date stamp encrypted, so that signal tapping and replay over hard wire may not be possible. Additionally, or alternatively, the unit may issue automated assistance summons in the event of excessive tilt or attempted theft. Additionally, or alternatively, the unit may monitor its own temperature and log it for failure analysis. Additionally, or alternatively, the unit may monitor status of all relays at all times. Additionally, or alternatively, the unit may monitor status of its incoming powered connections and notify driver if any of these connections become disconnected from power (once installed successfully).

In some example embodiments, the unit may be operated in one of the modes of operation listed below:

Mode 1—Normal operating mode—Ignition relays and fuel pump relays closed
Mode 2—Security Mode—Ignition relays open and fuel pump relay closed
Mode 3—Ultimate Security Mode—Ignition Relays and fuel pump relay open
Mode 4—Over heated engine Mode—Ignition Relays closed, fuel pump relay open The following description details how the aforementioned features may be accomplished.

Input feed from microprocessor (alternately, "uP") to Q1 transistor for startup and reset is continuously output from the uP to the Asynchronous Communication interface Adaptor ("ACIA") as Bit 6, and is zero normally (when neither startup or reset are occurring), Its output will swing between 0 to 3.3 VDC. The 3.3 VDC output should be sufficient to trigger Q6.

There exist two initialization logic flows. The first is used for product installation, while the second is d whenever power is lost then restored. Product installation requires the use of a steering wheel mounted cell phone and custom application ("app"). The product first requests the installer's cell phone number. Using a cellular phone transceiver chip within the device, the steering wheel cell phone and device establish bi-directional encrypted communication. Text messages from the device will be both audibly sounded as well as logged for communication trail purposes. Each wiring hook up required will be software checked for accuracy prior to moving on. First hook up power and ground. Through software, confirm power and ground were connected successfully. Once the ignition switch relay interface has been checked, the relays will remain open to confirm the car will not start. Then through software, close the relays and confirm the car starts normally. If at any time the relays refuse to change to open or closed state, inform the operator the unit is faulty. If the unit is faulty, return the unit then restart installation with a new unit. Next, assuming the unit passed the last test, hook up the fuel pump leads, power on lead first. Once the leads are software examined accurate, close the fuel pump relay and start the car. Through software, open the fuel pump relay. If the operator experienced an out of gas condition causing the engine to eventually stall, close the relay. Then insure the car starts normally. Next, hook-up the starter line tap to the unit, and confirm through software no power is present. Start the engine, while the starter is engaged, power should be briefly present on the starter line tap. If power was present momentarily, assume the starter line has been correctly connected. Next, connect the temperature gage loop tap to the device input. If it lies between 1 and 0 assume it is connected correctly. This completes the product installation. Text the installer, informing him job well done, and log installation time/date to flash RAM. Configure relays to security mode and bring up driver login app.

The CAL sensor input line is fed into uP as the analog to digital convert ("ADC") Line 11, DV/DT (The increase in voltage with respect to time is continuously monitored independent of temperature). Should this increase by 25% or more within 0.5 seconds, the bubble can be assumed to have reached a CAL end point. The sense a critical accident has occurred is 50%.

The accelerometer is also being simultaneously monitored for 85 degree shifts in vehicle orientation in the roll and flip directions. When the first 85 degree change in orientation is detected, the sense a critical accident has occurred is 50%.

Once the sense of a critical accident has occurred reaches 100% (i.e., both the CAL and accelerometer agree), universal asynchronous receiver transmitter ("UART")=0, Bit 6=1 is output. Timer 1 begins its count down of 20 ms. Once Timer is time elapsed is just enough to trip the magnetic latching relays (approx. 20 ms), UART 0, Bit 6=0 is output and the fact that sensor input has triggered the relays is recorded in flash memory to prevent all further sensing of initial accident criticality. Initial accident criticality is reported on every means of bus and cellular output available. Since there are now theft and critical accident output possibilities, a single wire output cannot be used.

uP controlled startup uses UART 0, Bits 0-5 as outputs to the bases of an 8-gate transistor array, replacing the DIP switches. UART 0, Bit 6 is used to pulse on/off transistor Q6 as needed to perform startup/reset operations for the ignition system relays. UART 0, Bit 7 is used to pulse on/off transistor Q7 as needed to perform startup/reset operations for the fuel pump relay.

Reset is performed by removing then re-applying power to the housings reed/black leads (provided the sensor input has triggered the relays, once reset is complete this fact is erased). Simply disconnecting the vehicles +12 VDC battery will cause the device to reset.

The Accelerometer is placed on the relay PCB and is interfaced directly into the uP's ADC1, ADC2 and ADC3. Utilize basic Accelerometer to uP schematic and canned software interface routines. The photo optics sensors, utilizing photo diodes, and cherry red emitters, are ORed into one line and fed into an additional ADC through a +12 VDC. GND, (plus other conductors) interface ribbon cable between PCBs.

I2C interface in both software and hardware. Serial bus interface in both software and hardware. Must record both high and low temperatures at equal priority, retaining these values in flash memory. Multiple processors. Utilize different resistor values to uniquely divide the voltage going into Multiplexer inputs 14 and 15 feeding ADC input. This way each processor will assume mastership in the order of greatest resistance used. The greater the resistance, the lower reading on the ADC. Using the ADC value as a countdown timer, the uP with the lowest timer countdown will boot first. Should communication cease from the primary for any reason, the next uP having the lowest ADC resistance will assume mastership. This way one can have as many potential master CPUs as necessary. By default, light an instrument panel warning light. Use the watch dog timer to insure the processor is operational. Once the processor becomes operational, extinguish the warning light. Should the processor ever cease functioning while the engine is running, re-light the warning light. Turn off the instrument panel warning light once the processor begins running normally. Power Line Monitored. Feed the +12VDC power line into ADC12. Use the Parallel Port 0, Bit 5 to control a transistor that switches on board battery power to the uP, multiplexer and cellular transceiver. Tap off the temperature gage loop, feeding the tap into Multiplexer Line 0 into ADC.

Use the device to monitor the actual engine temperature and learn when it is outside temperature thresholds to operate. If the engine is too cold or too hot to operate, based on menu tolerances set by the vehicle manufacturer, vehicle owner or owner's mechanic, a battery disconnect/connect will be required to enable the device to avoid monitoring current engine temperature for one restart. On subsequent restarts, the device will return to using its saved preset temperature starting values for tolerance range to enable engine start. Voltage division must be used on the input of the ADC to insure +3.3 VDC max. Also, the output of ADC must be connected to ground through high impedance so the signal transmitting the temperature to the dash gage will not be effected by the tap as it is not a good idea to shut off engine on the pilot whenever it gets too hot, but just shutting off the fuel pump when it's too hot would simulate an out of gas situation. Preventing the engine from starting when it is too cold ensures the warranty conditions are up kept safely.

Use the device as a security ally. When the key turns off a normally running engine, open the ignition circuit and close the fuel pump circuit. When the ignition power is manually shorted, by a thief, to jump the engine, open fuel pump circuit, log and notify of theft attempt to police and driver, initiate a one-day operational delay before the vehicle can be placed back in service to the owner. This is done because the starter line went high while the ignition relay was open. Once the one-day operational delay has lapsed, reconfigure the device back to normal engine off condition.

In the event that no theft attempt has occurred since turning the engine off, one way to permit engine start is to request at shut off time, the expected time the vehicle needs to remain off, prior to being restarted. This random time, known only to the operator and car's uP, could be used by the uP to auto configure the ignition relays to closed, precisely when the appropriate time has elapsed. With the ignition relays closed and the fuel pump relay closed, the engine may be restarted. The only problem with this solution is that one can very rarely predict precisely how long they require the engine to remain off. This is due to unpredictable appointment length times, shopping times, etc.

What is needed is an authorization signal which will positively identify the driver's presence to the car, while providing the maximum amount of safety during the vehicle restarting circumstance. The perfect authorization signal with today's technology is the brake light loop. When the driver steps on the brake to start the car, the software configures the ignition relays closed, enabling the car to start normally. Odds are the thief jump starting the car will not press on the brake during the theft. If the brake loop authorization signal standard be figured out by thieves, each driver may customize this signal for his own security; using for example, the right turn signal lamp loop instead.

Ultimate security mode. Tap the starter line, convert input to 3.3 VDC range and feed into a parallel port input. Should the input go high after the car is already started for approximately 5 seconds, apply the security feature. If the operator attempts to restart the car once it is started, disable the engine from operating until the battery is disconnected then reconnected. This feature should only be used in the event of a hostile takeover attempt or whenever you wish to safely leave the vehicle parked for a long period of time. In ultimate security mode, both the ignition switch relays and the fuel pump relay remain closed. The reason for engine disability must be logged, so that it may be referenced to restart properly. Once restarted, the reason for engine disability is cleared. If the car is immediately restarted you get the traditional starter grinding sound. Device engine disable forces a thief to both hot wire the ignition system and patch the break in the fuel pump line, prior to vehicle take over, all while the situation is being monitored by the uP.

Utilize the software to maintain logs from each device placed in a test environment. After the device(s) are returned, their logs may be analyzed to determine whether they performed properly.

Create a universal cradle to position a cell phone in the center of a steering wheel. The cradle will have a hook ad loop fastening flap at the top to prevent the phone from falling out during steering wheel rotation. An app to inquire a drivers PIN code or SSN will be needed to identify the driver to the device prior to starting the vehicle. The ID will not be stored in the phone, but may reside permanently in uP memory (encrypted). The ID will not change with time. The cradle can attach with two nylon cable ties on the backside of the steering wheel spokes.

A cellular RF transceiver located in the device will be used to transmit/receive messages from the steering wheel cell phone. The device will transmit all it needs by using a +12 VDC auto battery. This should provide the device with more transmission power than the typical cellular phone. The device cell phone transceiver will only be used during product installation, owner license update and report of most severe situations. All transceiver communication will be time/date stamp encrypted to avoid RF capture and playback.

Tap off automatic door lock loop to determine when the vehicle first starts to travel. Technically an auto theft cannot be recognized until the vehicle is physically moved from one place to another without the drivers consent. When the door lock tap goes high, place the device in Mode 3, shutting off the fuel supply. Using a timer, turn on the fuel pump when you are sure the vehicle has stalled. When the timer elapses place the device in Mode 3. This way the thief cannot ohm out the fuel pump line to determine that the location of the break occurred within the device. Also, when the auto theft is detectable, cellular call 911 with location, license and owner information, then call the owner informing him not to approach the vehicle until informed its safe by police.

The device may be protected to prevent criminals from removing the device, reconfiguring the wiring to original condition prior to device installation, then successfully jumping the car. The device will be designed to detect whenever someone tries to remove it while powered on, however, it cannot function fully to protect itself when power is cut off.

All wire taps required will only need 24 gage wire wrap wire put to the device. The CAL will be held down and accurately positioned on the PCB using three 24-gage wire wrap wire tie downs.

Circular Arc Level ("CAL") Sensor Details

The CAL sensor is a sensor that measures gravitational norm deviation while remaining impervious to the effects of acceleration, deceleration, impact and centripetal forces. It measures the angles an object is off from the vector of direct gravitational pull. More specifically, the CAL sensor is used to measure exact tilt, or inclination. In combination with a microprocessor, the change in inclination of an object with respect to time may be acquired. When used in perpendicularly oriented pairs, the CAL sensor may be used to measure both roll and flip of a vehicle. The CAL sensor offers a solid state solution to tilt detection since its only moving part is a frictionless bubble.

The air bubble disposed within the CAL sensor may be sized to satisfy necessary requirements for measuring the angle(s) of inclination. Without wishing to limit the invention to any theory or mechanism, the liquid disposed within the CAL sensor does not fully encompass the air bubble. Typically, the air bubble spans the width of the CAL sensor such that two opposite sides of the bubble are in constant contact with the inside of the CAL sensor. Thus, when the air bubble is disposed between a photodetector and an LED, the optical path of the light beam emitted from the LED goes through the air bubble without encountering the liquid. The light beam should be perpendicular to the CAL sensor surface to minimize light loss in refraction off the material (of which the CAL sensor is composed) the light is passing through. The photodetector may then read the angle as the light beam passes through the bubble. The volume of the bubble used by the CAL is best calculated by the mechanical design tool used to scale design the CAL itself. The tool positions the photo optic parts directly across from one another tangent to the CAL. The bubble must extend from the center point of the IR emitter to the end point of the CAL frame. Upwards, the bubble should extend to the full transmission cone of the IR emitter as the cone strikes to the furthest CAL wall. Assuming the IR emitter emits a cone of light having a broadcast angle A, then the bubble must extend upwards from the center point of the cone, which is CAL width * sin (A/2). Knowing the volume of the bubble and the volume of the CAL, which the mechanical model calculates, the volume of the antifreeze needed is given by the difference: (CAL volume)−(Bubble Volume). Having this volume measured in CCs the CAL may be filled easily with antifreeze using a broad needle syringe.

One concern with the CAL sensor is that vibration or pre-installation shaking may cause the air bubble within the CAL sensor to separate temporarily. However, as with a standard carpenter's level, which is filled with standard antifreeze, the air bubble instantly settles intact and usable after shaking.

Depending on the application, an arc of a circle may be sufficient for the design of the CAL sensor. However, some applications may require an entire circle. In some cases, the CAL may be filled with black dyed antifreeze, enabling it to withstand an expansive range of temperatures. For improved accuracy, the CAL sensor may be video recorded and computer analyzed. Even upon exiting an effect of a gravitational field, measurements obtained by the CAL sensor reflect the last known gravitational field situation. Upon entry to a gravitational field of increasing strength, the CAL sensor adjusts to reflect the object's orientation relative to gravitational field's norm of gravitational pull.

The CAL sensor is ideal for predicting and detecting vehicle rollover. To detect a roll over, it can be assumed that any vehicle whose center of mass rolls more than 90° will rollover on its side or possibly flip. The CAL sensor may be constructed to detect a roll of between 50 and 90° (selectable in increments of 10°) in either direction (50° to 90° or −50° to −90°) by adjusting the placement of the photodetectors and LEDs. In this way, an accident severe enough to be considered critical may be detected. FIG. 1 shows a configuration of the safety device utilizing the CAL sensor. The safety device is placed in a housing, and the housing may be oriented parallel to the vehicle firewall to detect roll severity. A second, identical housing, having a second safety device disposed therein, may be oriented perpendicularly to detect vehicle flip severity. By wiring the safety devices in parallel, the first safety device to register tilt deviation outside critical limits will result in an initiation of accident prevention measures (e.g. disconnection of ignition starter, shut down of the electrical system, a summoning of an emergency response, etc.).

A more advanced CAL sensor configuration may be constructed by adding a microprocessor, enough multiplexers to handle CAL sensor inputs, an analog to digital converter, and a digital output display. By reading light transmission through the air bubble and spacing photodetectors/LEDs such that a portion of the bubble can always be tracked, the CAL sensor can provide a continuous digital readout of the angular position of any object on which the CAL sensor is disposed.

When employed with a microprocessor (alternately, "uP"), one embodiment of the device comprises the following microprocessor input/outputs:

1) Serial communication line between uP and cell phone USB port (UART0, 19.2 KB) Encrypted bi-directional protocol to obtain engine startability in secure state. Encrypted bi-directional protocol to summon towing assistance, police assistance, rescue assistance, fire department assistance, etc. Based on reason for changing engine's operational status. Encrypted bi-directional protocol to toggle on/off transmission of cars GPS location.

2) Serial communication line between upper PCB and bottom PCB ACIA (UART1, 19.2 KB). Serial line bits: Bits 0,1: output to lower PCB transistor array to configure open//closed position of ignition relay 1 Bits 2,3: output to lower PCB transistor array to configure open/closed position of ignition relay 2; Bits 4,5: output to lower PCB transistor ay to configure open/closed position of fuel pump relay; Bit 6: output to lower PCB Q1 transistor used to apply power for configuration of ignition relays: Bit 7: output to lower PCB Q2 transistor used to apply power for configuration of fuel pump relay.

3) Vehicle temperature sensor inputs, to upper PCB, for line tap to ADC multiplexed line 0.

4) Vehicle starter line inputs, to upper PCB, for tapped input to Multiplexed ADC line 1.

5) Accelerometer line inputs, on upper PCB, to Multiplexed ADC lines 2, 3 and 4.

6) Parallel Port 0, Bits 0-3. Used to address multiplexer for input to ADC. 7) Interface cable between upper and lower PCBs of 9 Conductors: +12 VDC, GND and UART1 Xmit line, relay output leg status lines feeding as input to Multiplexer ADC lines 5, 6 and 7, and relay input leg status lines feeding as input to Multiplexer ADC lines 8, 9 and 10. Note—If all multiplexer inputs are 0-+12 VDC, a single voltage divider can be applied to the multiplexer output.

8) Parallel Port 0, Bit 4. Used in combination with inverter, to turn on/off uP status dashboard lamp based on uP's watch dog timer.

9) Auto battery input power line, for Multiplexer ADC line 12 Parallel Port 0, Bit 5. Status of auto power, 0=off, 1=+12 VDC.

10) CAL line input, on upper PCB, for Multiplexer ADC line 11.

11) Automatic door lock loop tap, on upper PCB, for Multiplexer ADC line 12.

12) Authorization to start: Brake line loop, on upper PCB for Multiplexer ADC line 13.

13) Multiple processor ADC feeds. Multiplexer input lines 14 and 15 are connected to unique resistive loads so that each microprocessor boots in order.

14) Parallel Port 0, Bit 5. Used as output of a jump start condition detected, 0—No jump start detected, 1—Jump start detected.

15) Parallel Port 0, Bit 6. Used to output condition of a critical accident. 0—No critical accident occurrence, 1—Critical Accident has occurred (only resettable by disconnecting/connecting +12 VDC power).

CAL Sensor Construction Possibilities

Depending on cost effectiveness, a CAL sensor may be designed for the roll over sensor in several different ways. In all instances, the CAL sensor must fit within an existing housing. Without wishing to limit the invention to any theory or mechanism, the following are possible methods for constructing the CAL sensor.

In some embodiments, the CAL may be constructed from flexible, clear tubing with end stoppers that either clamp or press fit. Removal and replacement of the end stopper allows for fill and fluid/bubble exchange. In some embodiments, the CAL sensor could be constructed from a clear glass arced tube sealed at both ends. The tube should have two holes drilled in it for air escape and fluid replacement. The tube should be rigid and placed on a raised floor to the mean height of the LED and photodetector. In some embodiments, the CAL sensor is perfect for a process control application for an automated syringed air/liquid sandwiched between two press fit plastic sheets with LED and photodetector housings formed in the plastic, especially once the optimal monitoring angle combination can be determined. p In some embodiments, the CAL sensor can be constructed from a leak proof press fit plastic arced tube having two holes on the top for liquid fill, then taped to prevent leakage. A universal plastic tray could be constructed to hold the arcuate tube, LEDs, and photodetectors in appropriate position. The LEDs and photodetectors may snap in place. Different tube arcs may be designed to expedite trigger time, with a center mark, so they could be taped into the tray approximately. This design could easily be upgraded as LED and photodetector size diminishes. This permits the arcuate tube and LEDs/photodetectors to be discarded and replaced easily.

If the CAL must be constructed in parts and bonded together, the bonding agent should be of exactly the same material from which the CAL is constructed. When constructing a CAL using a 3D printer, the CAL is typically created from three parts: the CAL/tray (to hold the photo optics in position), a cover to provide closure to the CAL, and a fill stopper (to completely seal the CAL once it is filled with antifreeze). By UV light bonding these three parts together with material that is identical to the material used to create the parts, one can be assured the CAL will remain leak proof under all temperature ranges the material itself can withstand. Expansion and contraction will occur. However, by bonding with the same construction material, the joints will expand and contract in exactly the same way as all parts comprising the CAL. Preliminary testing shows constructing the CAL of Samos WaterShed XC 11122 poly resin is satisfactory directly off the printer. No additives are necessary to add to the antifreeze and the porosity of the material is low enough for the CAL to remain leak resistant for the expected life of a passenger vehicle. Lastly, although, means to improve the plastic parts (e.g., making them more transparent and less porous using an acetone spray prior to bonding) exists, it is not recommended in order to keep the manufacturing costs minimized.

Potential Application of the Present Device: Auto-Theft Proof Design

Objectives of the auto-theft proof design: discern between a normal engine start and a thief's jump start; in the event of a jump start, disable the vehicle the instant it moves; lock thieves inside for up to a day maximum; and means by which vehicle is disabled must be temporary, so that it cannot be traced and bypassed in the future.

Additional Applications of the CAL Sensor

Additional and non-limiting applications of the CAL sensor include the following: Vehicle curve banking and forward incline/decline; Artificial equilibrium; Aircraft glidescope and dive/climb; Ship pitch and yaw; Gravitational field descent landing optimizer; Gravitational field detector; Tilt measurement tool (relative to gravitational field norm for Building construction and Process control; Adjustable tilt control; Gravitational guidance technology for Cruise missiles (full circle CAL sensor) and Rockets; Photographic orientation; Valuable artifact movement sensor (flattened arc, narrow bubble, peak point, monitored bi-directionality); Museum curios; Weapons in storage; and movement of Fuel storage casks.

As used herein, the term "about" refers to plus minus 10% of the referenced number.

Various modifications of the invention, in addition to those described herein will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the inventor is only to be limited by the following claims. Reference numbers recited in the below claims are solely for ease of examination of this patent application, and are exemplary, and are not intended in any way to limit the scope of the claims to the particular features having the corresponding reference numbers in the drawings. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as 'consisting of', and as such the written description requirement for claiming one or more embodiments of the present invention using the phrase "consisting of" is met.

What is claimed:

1. A vehicle safety rollover device, that upon detection of a vehicle rollover, automatically shuts-off power to an ignition system of said vehicle and notifies need to shut down an electrical system of said vehicle, said device comprising:
   (a) a power input;
   (b) a ground input (105) operatively connected to a vehicle common ground;
   (c) a first latching relay switch (103) and a second latching relay switch (117), each comprising:
      (i) an input,
      (ii) a first output position,
      (iii) a second output position,
      (iv) a set pin, and
      (v) a reset pin,
   wherein each latching relay switch is initially in the first output position, wherein each latching relay switch switches from the first output position to the second output position when power is supplied to the set pin, wherein each reset pin is connected to the ground input (105);
   (d) an ignition start input (111) operatively connected to the input of the first latching relay switch (103);
   (e) an ignition start output (115) operatively connected to the first output position of the first latching relay switch (103);
   (f) an electrical shut-off signal (112) operatively connected to the second output position of the second latching relay switch (117), wherein the input of the second latching relay switch (117) is operatively connected to the power input; and
   (g) a circular arc level (200), herein referred to as a CAL sensor (200), comprising an arcuate tube (201) having light emitters and detectors coupled to an exterior of the arcuate tube (201), the CAL sensor (200) configured to supply power to each set pin when the CAL sensor (200) is activated,
   wherein initially, power flows through the first latching relay switch (103) to an ignition relay of the ignition system, wherein the second latching relay switch (117) disconnects the electrical shutoff signal (112) from the power input, wherein when the CAL sensor (200) is activated, power flows from the power input to each set pin, causing the first (103) and the second (117) latching relay switches to switch from the first output position to the second output position, whereupon switching, power to the ignition relay is disconnected, wherein power then flows to the electrical shutoff signal (112) via the second latching relay switch (117), thereby causing the electrical system of the vehicle to shut down.

2. The device of claim 1, wherein the power is supplied from a battery power (108).

3. The device of claim 1, wherein the power is supplied from an alternator power (104).

4. The device of claim 1, wherein the power is supplied from an alternator power (104) and a battery power (108).

5. The device of claim 4 further comprising a conductive pin operatively connected to the battery power (108).

6. The device of claim 5 further comprising a transistor (133) comprising a base pin, a collector pin, and an emitter pin, wherein the collector pin is connected to the alternator power (104), wherein the emitter pin is connected to all four latching relay switches (103), (117), (102), and (101).

7. The device of claim 6 further comprising a switch operatively coupling the conductive pin and the base pin, wherein the switch is normally open.

8. The device of claim 1, wherein a liquid partially fills the arcuate tube (201), wherein an air bubble (203) is disposed in the arcuate tube (201) such that the liquid and the air bubble (203) fill the arcuate tube (201), wherein the CAL sensor (200) is fixed to the body of the vehicle, wherein the CAL sensor (200) is in an upright position relative to gravity when an inclination of the CAL sensor (200) is zero, wherein when the CAL sensor (200) is in the upright position, the air bubble (203) is in a resting position at an apex of the arcuate tube (201).

9. The device of claim 8, wherein the light emitters comprise:
  (a) a first light emitting element (205) disposed on the exterior of the arcuate tube (201) at a first location about 75°-90° from the apex of the arcuate tube (201), wherein the first light emitting element (205) emits a first optical signal; and
  (b) a second light emitting element (207) disposed on the exterior of the arcuate tube (201) at a second location about 270°-285° from the apex of the arcuate tube (201), wherein the second light emitting element (207) emits a second optical signal.

10. The device of claim 9, wherein the detectors comprise:
  (a) a first photodetector (209) disposed on the exterior of the arcuate tube (201) at a third location about 75°-90° from the apex of the arcuate tube (201), wherein the third location is opposite the first location such that the arcuate tube (201) is disposed between the first photodetector (209) and the first light emitting element (205), wherein the first photodetector (209) is positioned to detect the first optical signal; and
  (b) a second photodetector (211) disposed on the exterior of the arcuate tube (201) at a fourth location about 270°-285° from the apex of the arcuate tube (201), wherein the fourth location is opposite the second location such that the arcuate tube (201) is disposed between the second photodetector (211) and the second light emitting element (207), wherein the second photodetector (211) is positioned to detect the second optical signal;
wherein when the CAL sensor (200) is in the upright position, the liquid blocks detection of the first optical signal and the second optical signal,
wherein at an inclination of the CAL sensor (200) within a first threshold window, centered between about 75° and 90° from the apex of the arcuate tube (201), the air bubble (203) travels from the resting position to a position between the first photodetector (209) and the first light emitting element (205) thus activating the CAL sensor (200) by permitting detection of the first optical signal, whereupon detecting the first optical signal, the first photodetector (209) transmits a first signal that activates the switch to close thereby forming a closed circuit, which allows current to flow through the conductive pin to the base pin to open an electrical path from the battery power to each set pin,
wherein when the CAL sensor (200) is tilted within a second threshold window, centered between about 270° and 285° from the apex of the arcuate tube (201), the air bubble (203) travels from the resting position to a position between the second photodetector (211) and the second light emitting element (207) thus activating the CAL sensor (200) by permitting detection of the second optical signal, whereupon detecting the second optical signal, the second photodetector (211) transmits a second signal that activates the switch to close thereby forming a closed circuit, which allows current to flow through the conductive pin to the base pin to open an electrical path from the battery power to each set pin.

11. The device of claim 4 further comprising a third latching relay switch (101) and a fourth latching relay switch (102) each comprising:
  (a) an input,
  (b) a first output position,
  (c) a second output position,
  (d) a set pin, and
  (e) a reset pin,
wherein each latching relay switch is initially in the first output position, wherein each latching relay switch switches from the first output position to the second output position when power is supplied to the set pin, wherein each reset pin is connected to the ground input (105).

12. The device of claim 11 further comprising a first ignition switch motor-on input (110), operatively connected to the input of the third latching relay switch (101), and a second ignition switch motor-on input (110), connected to the input of the fourth latching relay switch (102).

13. The device of claim 12 further comprising a first ignition switch motor-on output (113), operatively connected to the first output of the third latching relay switch (101), and a second ignition switch motor-on output (114), operatively connected to the first output of the fourth latching relay switch (102).

14. The device of claim 13, wherein initially, the alternator power (104) flows through the third (101) and fourth (102) latching relay switch to the first (110) and the second (110) ignition switch motor-on input, wherein when the CAL sensor (200) is activated, power flows from the power input to the set pins of the first (103), the second (117), the third (101), and the fourth (102) latching relay switches, causing each relay switch to switch from the first output position to the second output position, wherein power to the first ignition switch motor-on input (110), the second ignition switch motor-on input (110), and the ignition relay is disconnected, wherein power flows to the electrical shutoff signal (112), thereby causing: the electrical system of the vehicle to shut down, a disabling of all accessories, a notifying of an overseeing computer, a summoning of an emergency response and/or a depressurization of one or more fuel lines.

15. A vehicle safety rollover device, that upon detection of a vehicle rollover, automatically shuts-off power to an ignition system of said vehicle and notifies need to shut down an electrical system of said vehicle, said device comprising:
  (a) an ignition control relay (517) having a first latching relay switch (103) and a second latching relay switch (117);
  (b) a sensor (200) configured to supply power to the first latching relay switch (103) and the second latching relay switch (117) when the sensor (200) is activated;
wherein when the sensor (200, 510) is activated, power flows from the power input to a set pin of each of the first latching relay switch and the second latching relay switch, causing the first latching relay switch (103) and the second (117) latching relay switches to switch from a first output position to a second output position, whereupon switching, power to the ignition relay is disconnected, wherein power then flows to an electrical shutoff signal (112) via the second latching relay switch (117), thereby causing the electrical system of the vehicle to shut down.

16. The vehicle safety rollover device of claim 15, further comprising a photo optic circuitry (516) coupled to the sensor (200) that controls one or more photo optic components of the sensor (200).

\* \* \* \* \*